(12) United States Patent
Zuercher et al.

(10) Patent No.: US 8,739,935 B2
(45) Date of Patent: Jun. 3, 2014

(54) PORTABLE WHEEL CHAIR LIFT

(75) Inventors: Eric Zuercher, Tucson, AZ (US); James T. Coble, Vail, AZ (US)

(73) Assignee: AGM Container Controls, Inc., Tucson, AZ (US)

( * ) Notice: Subject to any disclaimer, the term of this patent is extended or adjusted under 35 U.S.C. 154(b) by 12 days.

(21) Appl. No.: 13/075,423

(22) Filed: Mar. 30, 2011

(65) Prior Publication Data

US 2011/0174579 A1   Jul. 21, 2011

Related U.S. Application Data

(63) Continuation of application No. 11/026,863, filed on Dec. 30, 2004, now Pat. No. 7,926,618.

(51) Int. Cl.
| | | |
|---|---|---|
| B66B 9/04 | (2006.01) | |
| B66F 7/20 | (2006.01) | |
| B66B 9/16 | (2006.01) | |
| A61G 3/06 | (2006.01) | |
| B60P 1/44 | (2006.01) | |

(52) U.S. Cl.
USPC ........... 187/200; 187/240; 187/243; 187/274; 414/541; 414/545; 414/921; 254/89 H (58) Field of Classification Search
CPC .......... B66B 9/02; B66B 9/04; B66B 9/0853; B66B 9/187; A61G 3/06; A61G 3/0808
USPC ........ 187/211, 269, 274, 200, 240, 242, 243, 187/244; 254/8 R, 2 C, 9 C, 10 C, 89 H, 93 R; 414/540, 541, 921, 545

IPC .................... B66B 9/16,9/08, 9/02; A61G 3/02, A61G 3/06, 3/08; B66F 7/16, 7/20; B60P 1/44
See application file for complete search history.

(56) References Cited

U.S. PATENT DOCUMENTS

| | | |
|---|---|---|
| 2,514,314 A | 7/1950 | Denton |
| 2,724,520 A | 11/1955 | Overbeck |

(Continued)

FOREIGN PATENT DOCUMENTS

| | | |
|---|---|---|
| DE | 3325036 A1 | 1/1985 |
| DE | 102005042630 A1 | 3/2007 |

(Continued)

OTHER PUBLICATIONS

EPO, Machine Translation, Description DE3325036, Feb. 25, 2013, pp. 1-3.*

(Continued)

*Primary Examiner* — William A Rivera
*Assistant Examiner* — Stefan Kruer
(74) *Attorney, Agent, or Firm* — Cahill Glazer PLC (57) ABSTRACT

A portable wheel chair lift device includes a lift car, a support base, and a lifting mechanism coupled thereto to selectively raise or lower the lift car while allowing the floor of the lift car to be fully-lowered to the ground surface. The lift car floor can be folded and collapsed to a reduced width allowing transport through narrow passages. Transport casters are removably mounted to the bottom of the lift car to facilitate transport. The lift device includes a height adjustment control within the lift car to repeatably raise the lift car to the height of a stage.

2 Claims, 9 Drawing Sheets

(56) References Cited

U.S. PATENT DOCUMENTS

| | | |
|---|---|---|
| 3,172,501 A | 3/1965 | Ramer |
| 3,341,760 A | 9/1967 | Fry |
| 3,522,925 A | 8/1970 | Buchtel et al. |
| 3,524,563 A | 8/1970 | McCartney et al. |
| 3,526,066 A | 9/1970 | Gamble et al. |
| 3,661,228 A | 5/1972 | Glasser |
| 3,785,462 A | 1/1974 | Coad et al. |
| 3,806,092 A | 4/1974 | Richards |
| 3,829,115 A | 8/1974 | Rich |
| 3,879,050 A | 4/1975 | Young |
| 3,880,259 A | 4/1975 | Richards |
| 3,888,463 A | 6/1975 | O'Brien et al. |
| 3,902,573 A | 9/1975 | Grove et al. |
| 3,982,718 A | 9/1976 | Folkenroth et al. |
| 4,056,203 A | 11/1977 | Meldahl et al. |
| 4,063,619 A | 12/1977 | Drews |
| 4,173,268 A | 11/1979 | Nussbaum |
| 4,176,732 A | 12/1979 | Nordskog |
| 4,219,103 A | 8/1980 | Harsacky |
| 4,392,771 A | 7/1983 | Smalley |
| 4,457,402 A | 7/1984 | Del Vecchio et al. |
| 4,466,771 A | 8/1984 | Thorley et al. |
| 4,479,753 A | 10/1984 | Thorley |
| 4,488,326 A | 12/1984 | Cherry |
| 4,499,970 A | 2/1985 | Hussey |
| 4,556,128 A | 12/1985 | Thorley et al. |
| 4,576,539 A | 3/1986 | Williams |
| 4,785,915 A | 11/1988 | Shah et al. |
| 4,787,111 A | 11/1988 | Pacek et al. |
| 4,926,973 A | 5/1990 | Smith |
| 4,941,797 A | 7/1990 | Smillie, III |
| 4,971,178 A | 11/1990 | Schauder et al. |
| RE33,595 E | 5/1991 | Sullivan et al. |
| 5,040,638 A | 8/1991 | Smith |
| 5,040,936 A | 8/1991 | Rhea |
| 5,046,585 A | 9/1991 | Ohta et al. |
| 5,052,879 A | 10/1991 | Wolfe |
| 5,105,915 A | 4/1992 | Gary |
| 5,149,246 A | 9/1992 | Dorn |
| 5,154,569 A | 10/1992 | Eryou et al. |
| 5,205,697 A | 4/1993 | Getty et al. |
| 5,275,526 A | 1/1994 | Moseley |
| 5,281,017 A | 1/1994 | Geiss, II |
| 5,322,408 A | 6/1994 | Wooden |
| 5,346,355 A | 9/1994 | Riemer |
| 5,382,130 A | 1/1995 | Kempf |
| 5,426,817 A | 6/1995 | Rekuc |
| 5,433,581 A | 7/1995 | Farsai |
| 5,476,155 A | 12/1995 | Nakatani et al. |
| 5,499,694 A | 3/1996 | Dorn |
| 5,513,943 A | 5/1996 | Lugash et al. |
| 5,553,990 A | 9/1996 | Kytola, Sr. |
| 5,595,470 A | 1/1997 | Berkey et al. |
| 5,597,282 A | 1/1997 | Hoffman et al. |
| 5,624,009 A * | 4/1997 | Benjamin et al. ............ 187/201 |
| 5,674,043 A | 10/1997 | Dorn |
| 5,822,829 A | 10/1998 | Webb et al. |
| 5,887,680 A | 3/1999 | Carson et al. |
| 5,941,347 A | 8/1999 | Pfleger et al. |
| 5,947,231 A | 9/1999 | Raab et al. |
| 5,954,160 A | 9/1999 | Wells, Sr. et al. |
| 5,992,571 A | 11/1999 | Lee |
| 6,039,528 A | 3/2000 | Cohn |
| 6,059,263 A * | 5/2000 | Otema et al. ................ 254/89 H |
| 6,062,809 A | 5/2000 | Berkey et al. |
| 6,086,314 A | 7/2000 | Savaria |
| 6,095,747 A | 8/2000 | Cohn |
| 6,109,395 A | 8/2000 | Storm |
| 6,119,815 A | 9/2000 | Ziegler |
| 6,182,798 B1 | 2/2001 | Brady et al. |
| 6,203,266 B1 | 3/2001 | Savaria et al. |
| 6,345,694 B1 | 2/2002 | Volker |
| 6,419,050 B1 | 7/2002 | Sardonico |
| 6,435,804 B1 | 8/2002 | Hutchins |
| 6,467,785 B2 | 10/2002 | Toppses |
| 6,516,478 B2 | 2/2003 | Cook et al. |
| 6,585,474 B1 | 7/2003 | Kameda |
| 6,601,677 B1 | 8/2003 | Storm |
| 6,814,342 B1 | 11/2004 | Perlstein et al. |
| 6,837,670 B2 | 1/2005 | Goodrich |
| 7,284,944 B1 | 10/2007 | Schlangen |
| 7,395,900 B2 * | 7/2008 | Murray et al. ................ 187/200 |
| 8,079,447 B2 * | 12/2011 | Zuercher ...................... 187/200 |
| 8,146,713 B2 * | 4/2012 | Rosenthal ..................... 187/245 |
| 2003/0213653 A1 | 11/2003 | Morris |
| 2013/0112504 A1* | 5/2013 | Zuercher ...................... 187/200 |

FOREIGN PATENT DOCUMENTS

| | | | |
|---|---|---|---|
| GB | 1502921 | 3/1978 | |
| JP | 9-173390 | 7/1997 | |
| JP | 2004-182352 | 7/2004 | |
| JP | 2004217396 A * | 8/2004 | ............... B66F 7/20 |

OTHER PUBLICATIONS

"Ascension Portable Wheelchair Lift" brochure, published by AGM Container Controls, Inc., and describing Models SLA-2050ED and SLA-2050ESD, both offered for sale in the United States prior to Dec. 2003.

* cited by examiner

PORTABLE WHEEL CHAIR LIFT

CROSS REFERENCE TO RELATED APPLICATION

The present application is a continuation of U.S. patent application Ser. No. 11/026,863, filed on Dec. 30, 2004, and entitled "PORTABLE WHEEL CHAIR LIFT", and the benefit of the earlier filing date of such application is hereby claimed under 35 U.S.C. §120.

BACKGROUND OF THE INVENTION

1. Field of the Invention

The present invention relates generally to lifting devices, and more particularly, to a portable wheelchair lift device to provide access to stages, platforms, risers and the like for individuals with disabilities.

2. Description of the Background Art

Under the Americans With Disabilities Act of 1990 (the "ADA"), the U.S. government required that public buildings be accessible to the disabled. For persons requiring a wheelchair for mobility, abrupt changes in floor elevation have to be modified to enable access by wheelchair. For new construction, a ramp is typically provided and the pitch or grade on the ramp can be no greater than one inch of rise per foot of horizontal travel and a horizontal landing five feet in length must be provided for every thirty inches of vertical travel. However, a ramp of such length occupies a significant amount of floor space. For older buildings, or even newer building where space is limited, the requirement for a ramp may simply not be practical.

The ADA also permits a vertical lifting device instead of a fixed ramp. Typically, such lifting devices are permanently mounted and include a short ramp for entering a small car which is raised and lowered by a suitable jack mechanism. Under the ADA, such lifting devices must have side walls no less than forty-two inches high and include a grab bar on one side wall. Travel surfaces must be non-skid, and the jack mechanism must be suitably enclosed.

Some available fixed lifting devices include solid side walls, and may omit a gate on one end of the lifting device. Such lifting devices can be uncomfortable to ride if one is claustrophobic or a young child; moreover, having an open end on a lift car is not safe.

Most stages in public buildings are less than about forty-two inches above the floor or ground level. As used herein, the term "stage" refers to an elevated floor, whether or not the elevated floor is actually a stage in a theater or in an auditorium. Thus, lifting devices that can elevate a user to a stage height of 42 inches are generally acceptable, though it would clearly be an advantage to reach heights of 60 inches or more.

Mobile lifting devices for the disabled are known in the prior art, e.g. as described in U.S. Pat. No. 5,105,915 (Gary) which describes a lifting device having a car including fixed sides and short, one-piece ramps at each end. The car is raised and lowered by a pantograph jack including a hydraulic pump driven by an electric motor controlled by switches. The patent also describes several lifting devices of the prior art.

An improved mobile lifting device is disclosed within U.S. Pat. No. 6,182,798 to Brady, et al., and assigned to AGM Container Controls, Inc., the assignee of the present invention. The '798 patent discloses a lift device with gates at both ends of the lift car, transparent walls, a loading ramp, a dock plate, a stage height sensor, and numerous safety features.

Nonetheless, the mobile lifting device disclosed in the aforementioned Brady '798 patent does not solve all problems that have been experienced with mobile lifting devices. For example, even when the lift car is lowered to its lowermost position, it still does not lie close enough to the ground to allow a user of a wheelchair to wheel himself or herself directly into the lift car. The lifting mechanism is housed under the lift car, so the lift car can never be lowered fully to the ground. Instead, a foldable entry ramp must be provided to enable the user to get into the lift car. This entry ramp not only adds weight and material cost to the mobile lifting device, but also poses an inconvenience to both the user and any attendant assisting the user. In addition, the requirement for an entry ramp imposes space limitations on the lift device. For example, there must be enough space between the stage and any nearby walls, or between the stage and the seating area, to accommodate not only the length of the lift car but also the additional length of the deployed entry ramp.

The mobile lift device shown in the Brady '798 patent includes a stage sensor for enabling the lift device to sense when the lift car has reached the elevation of the stage. This stage sensor must be separately disposed on the stage. Moreover, the stage sensor may inadvertently, or maliciously, be moved out of position, resulting in the lift car stopping at the wrong height.

In addition, the mobile lift device shown in the Brady '798 patent has a fixed width, i.e., the overall width of the lift device is at least as wide as the width of the lift car. It often occurs that such mobile lift devices must be transported through doorways; if the doorway is rather wide (i.e., 48" or greater), then transporting the lift device through the doorway is usually not a problem. However, it is often impractical or impossible to transport such known lift devices through doorways narrower than 48", such as relatively-narrow 36" doorways often found in buildings with single doorways like older schools. This explains why the hydraulic jack mechanism used to raise the lift car is disposed directly below the lift car; were the hydraulic jack mechanism moved out around the sides of the lift car, the overall width of the lift device would be increased even more.

The Brady '798 patent discloses a mobile lifting device equipped with retractable wheels for transport. When the lift device is to be transported, the wheels are extended from the base to raise the base off of the ground. When the lift device is in proper position for use, the wheels are retracted, allowing the base to directly engage the ground. The extension and retraction of such wheels is controlled by a crank which must be rotated to raise or lower each of the four wheels. This requires some significant physical effort, as well as significant time. Moreover, the size of such wheels is relatively small (typically 3.5 inches) to allow the wheels to fit under the base. However, such small wheels make it more difficult to transport the lifting device, particularly over soft and/or irregular floor surfaces, including carpeted floors or stadium turf.

In view of the foregoing, it is an object of the present invention to provide a portable lift device suitable for lifting wheelchair-bound users up to the height of stages, platforms, risers and the like in a safe and reliable manner, and comporting with all applicable ADA requirements.

Another object of the present invention is to provide such a lift device capable of lifting users 60 inches or more above the ground while maintaining a relatively low profile when the lift car is lowered to the ground.

Yet another object of the present invention is to provide such a lift device which requires minimal floor space, and which is capable of allowing users to enter the lift car even when the stage is positioned relatively close to a wall, seating area, or other obstacles.

Still another object of the present invention is to provide such a lift device which can be transported through relatively narrow passageways from one site to another while still providing a space within the lift car wide enough to comply with ADA regulations (a clear inner width of at least 36 inches) during actual usage.

A further object of the present invention is to provide such a lift device as a self-contained unit wherein the elevational height of the lift car can be adjusted to proper stage height by the managers/owners of the facility in a repeatable fashion, without relying upon wands, sensors or switches on the stage, while protecting against inadvertent or malicious alteration by unauthorized persons.

A still further object of the present invention is to provide such a lift which can be quickly and easily transported from one site to the next with minimal effort, while accommodating relatively large transport wheels.

Another object of the invention is to provide a lifting device in which the lift car can be safely raised and lowered by a passenger or an attendant.

These and other objects of the present invention will become more apparent to those skilled in the art as the description of the present invention proceeds.

SUMMARY OF THE INVENTION

Briefly described, and in accordance with one aspect thereof, the present invention relates to a lift device that may be used to provide access to a stage (174), platform, riser of the like for individuals with disabilities, including persons who rely upon wheelchairs or crutches to move about. The lift device includes a lift car (162) suitable for supporting a person (166) in a wheel chair (168). First and second supports (161, 163) are disposed on opposing sides of the lift car (162) for resting upon a ground surface. A lifting mechanism, which might include a pair of hydraulic cylinders (50, 52), an electric motor (56) and a hydraulic pump (58), is housed within the first and second supports. This lifting mechanism is coupled with the lift car (162) to selectively raise or lower the lift car. By moving the lifting mechanism out from under the lift car, the floor (170/196) of the lift car can be fully-lowered to the ground surface. This in turn permits a user to enter or exit the lift car without the aid of a loading ramp, thereby making maximum usage of available floor space. Ideally, such lift device is portable for use at multiple locations.

Figure 1:
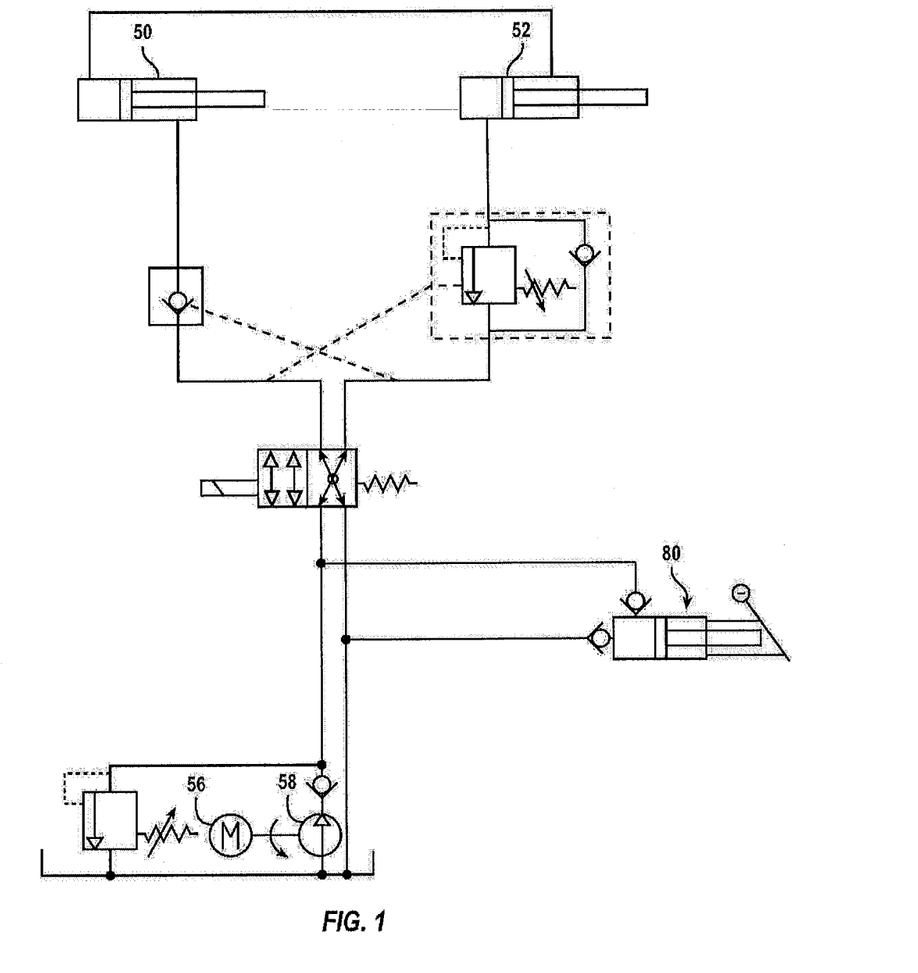
FIG. 1 is a schematic drawing of the hydraulic lifting mechanism, including an electric motor, hydraulic gear pump, supplemental hand pump, control valves, and hydraulic cylinders.
Figure 2:
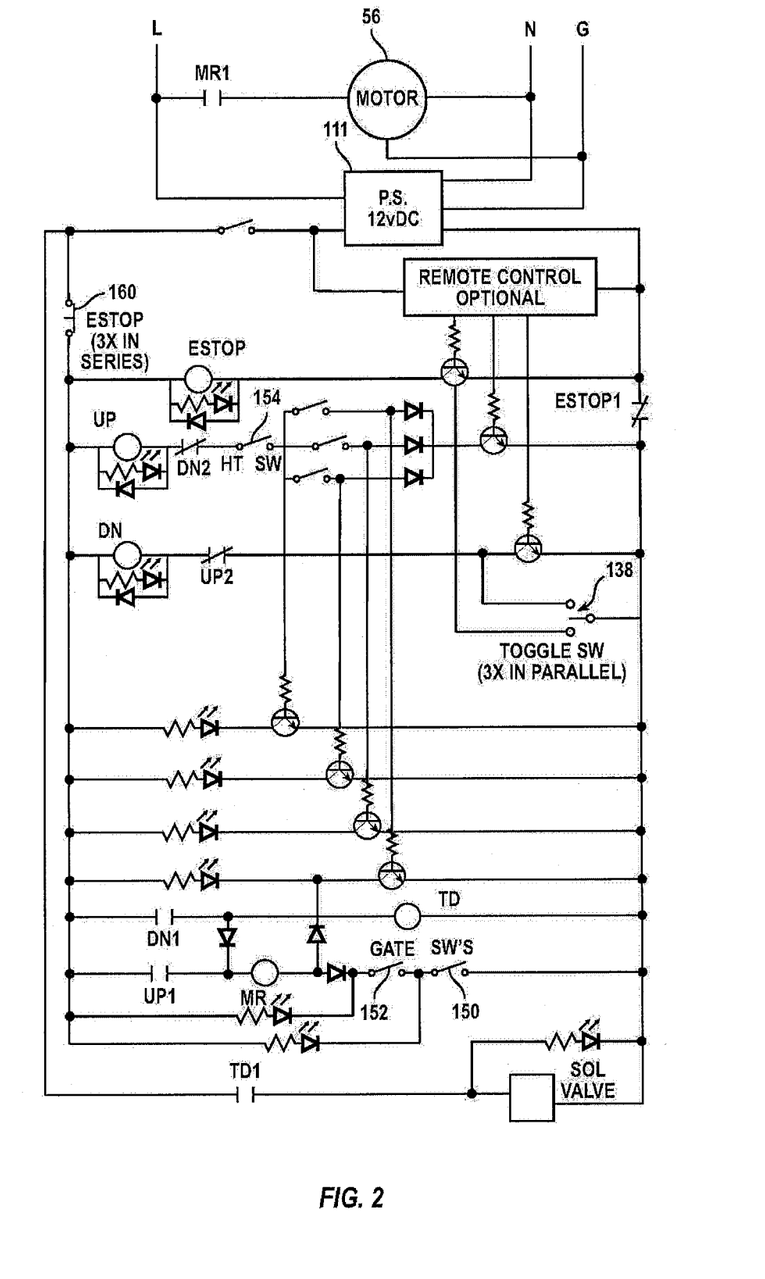
FIG. 2 is an electrical circuit schematic illustrating the switches and control circuitry for controlling the operation of the motor that powers the hydraulic lifting mechanism.
Figure 3:
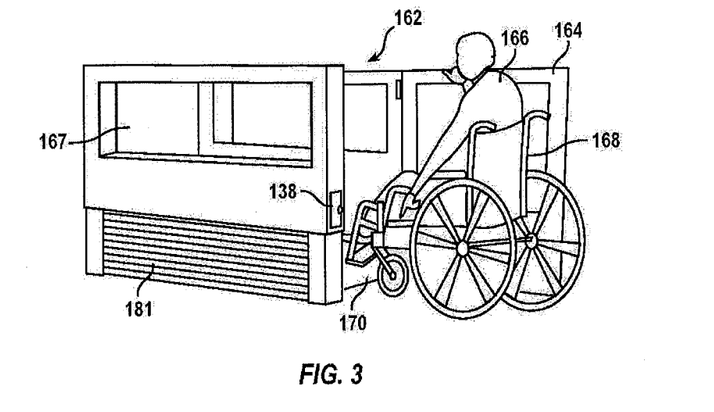
FIG. 3 shows a user entering the lift car from the ground.
Figure 4:
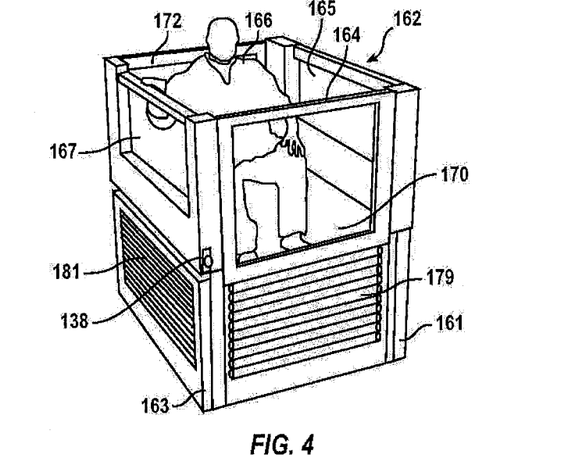
FIG. 4 shows a user being lifted in the lift car.
Figure 5:
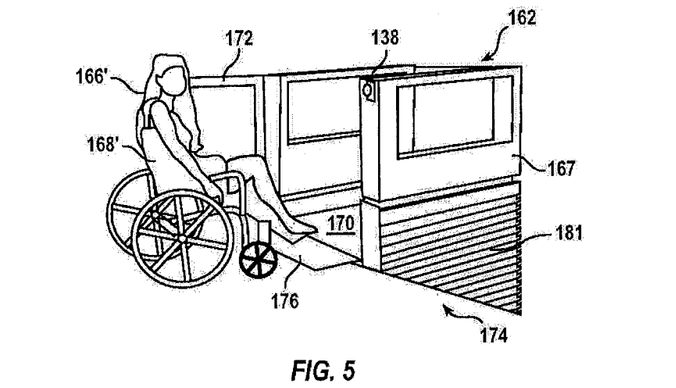
FIG. 5 shows a user entering the lift car from the stage through the stage gate.
Figure 6:
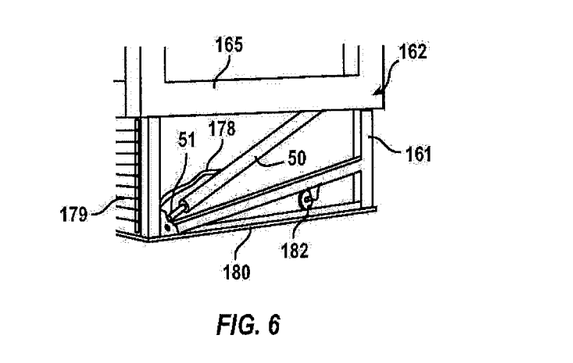
FIG. 6 shows one of the hydraulic cylinders used to raise the lift car.
Figure 7:
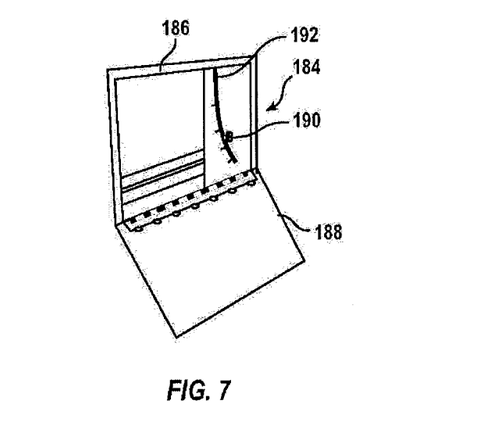
FIG. 7 shows the lift car height adjustment control knob riding within an arcuate track on the lift car side wall.
Figure 8:
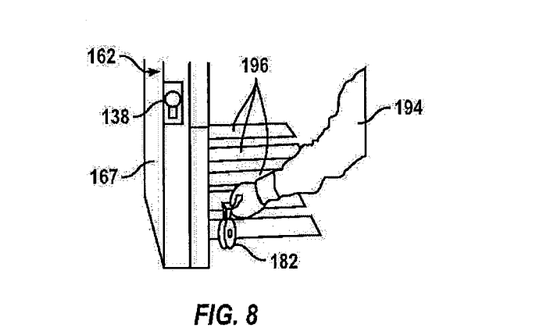
FIG. 8 shows the transport casters being installed for transporting the lift device.
Figure 9:
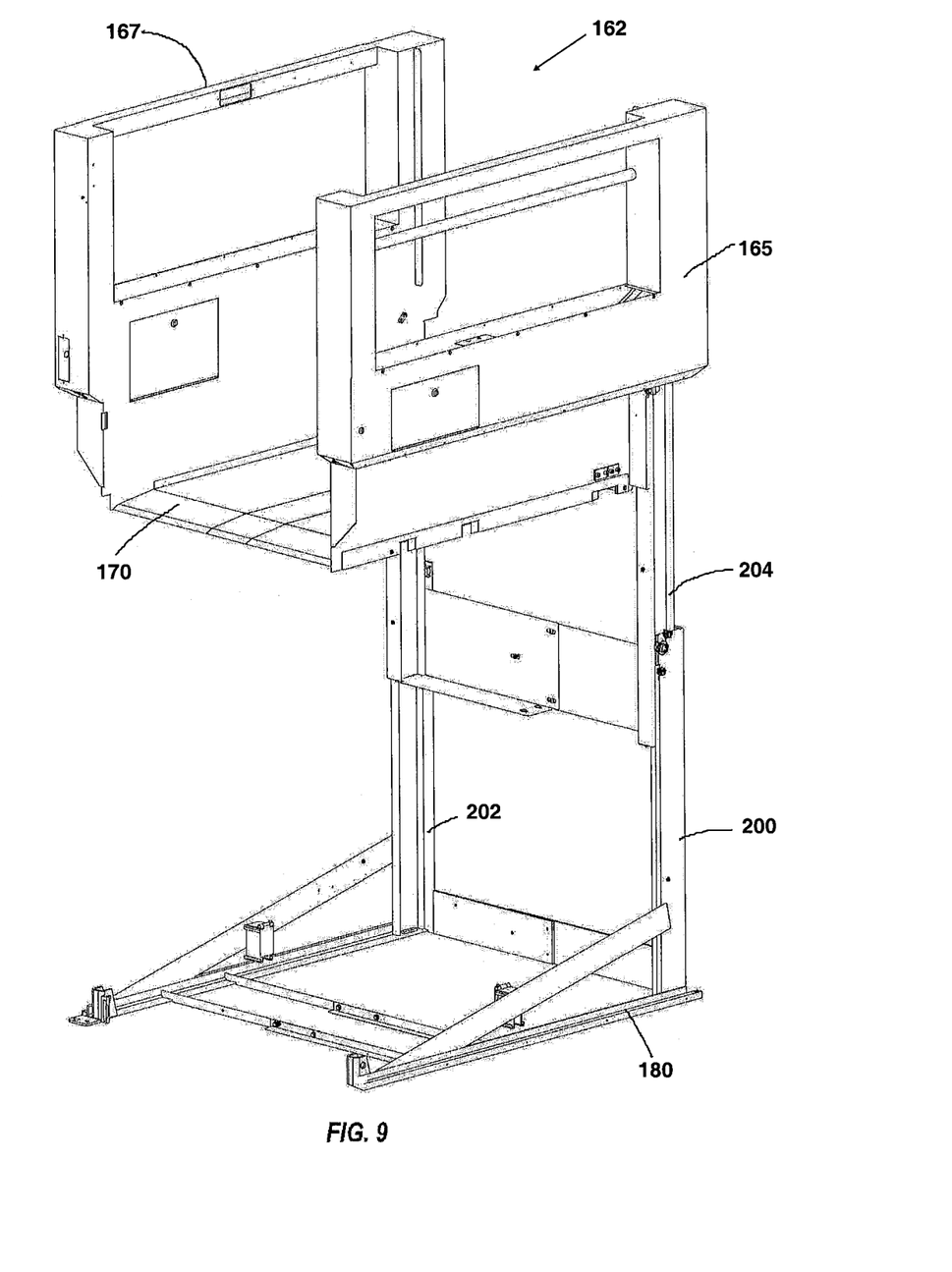
FIG. 9 is a perspective view of the lift device with several components removed for clarity, and with the lift car in a raised position, and illustrating vertical fixed tracks of the first and second supports, as well as a pair of movable intermediate members that slide along the fixed tracks, each of the intermediate members including a lift car track for being engaged by a roller of the lift car.
Figure 10:
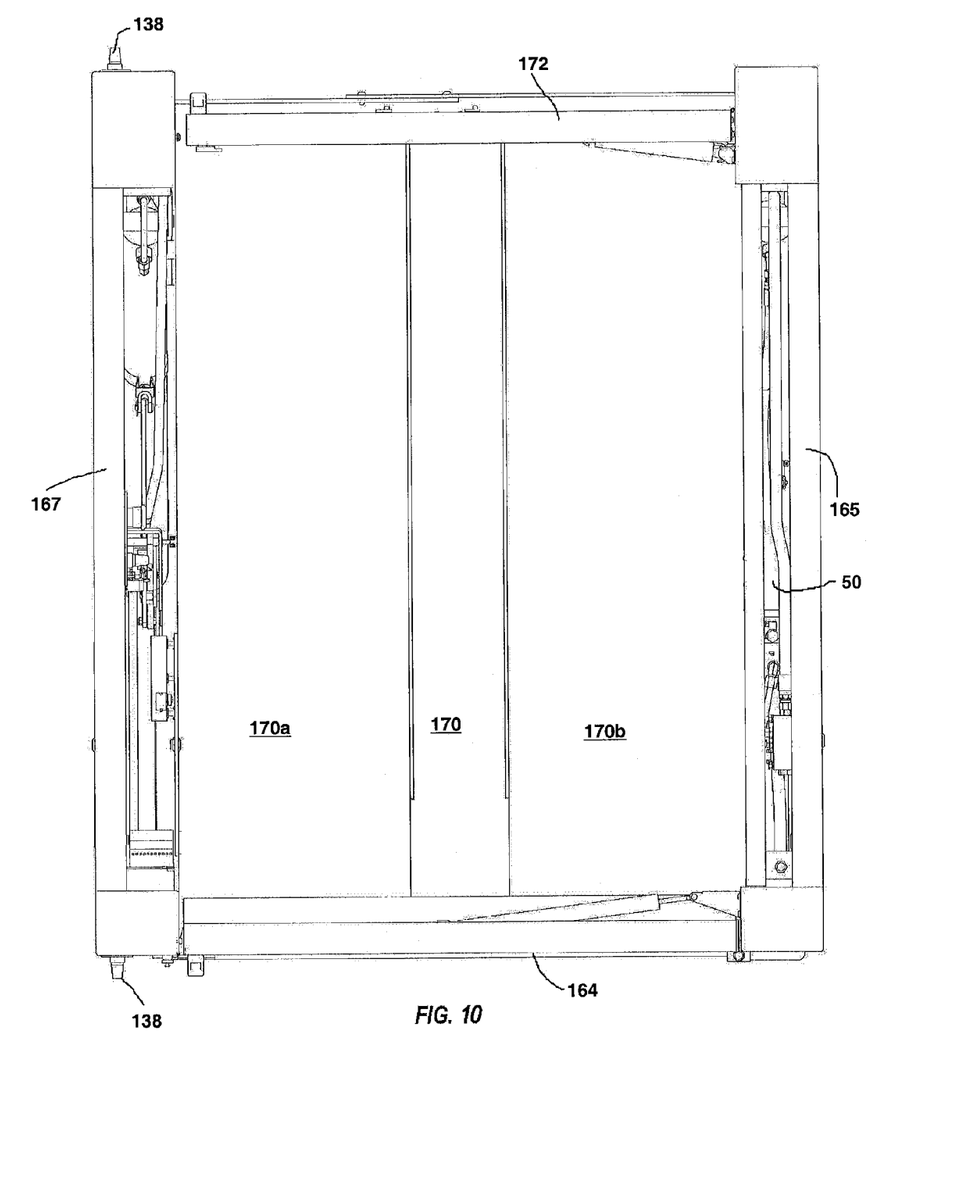
FIG. 10 is a top view of the lift device and illustrating a pair of outer floor panels hingedly connected to a narrower central floor panel of the lift car.
Figure 11:
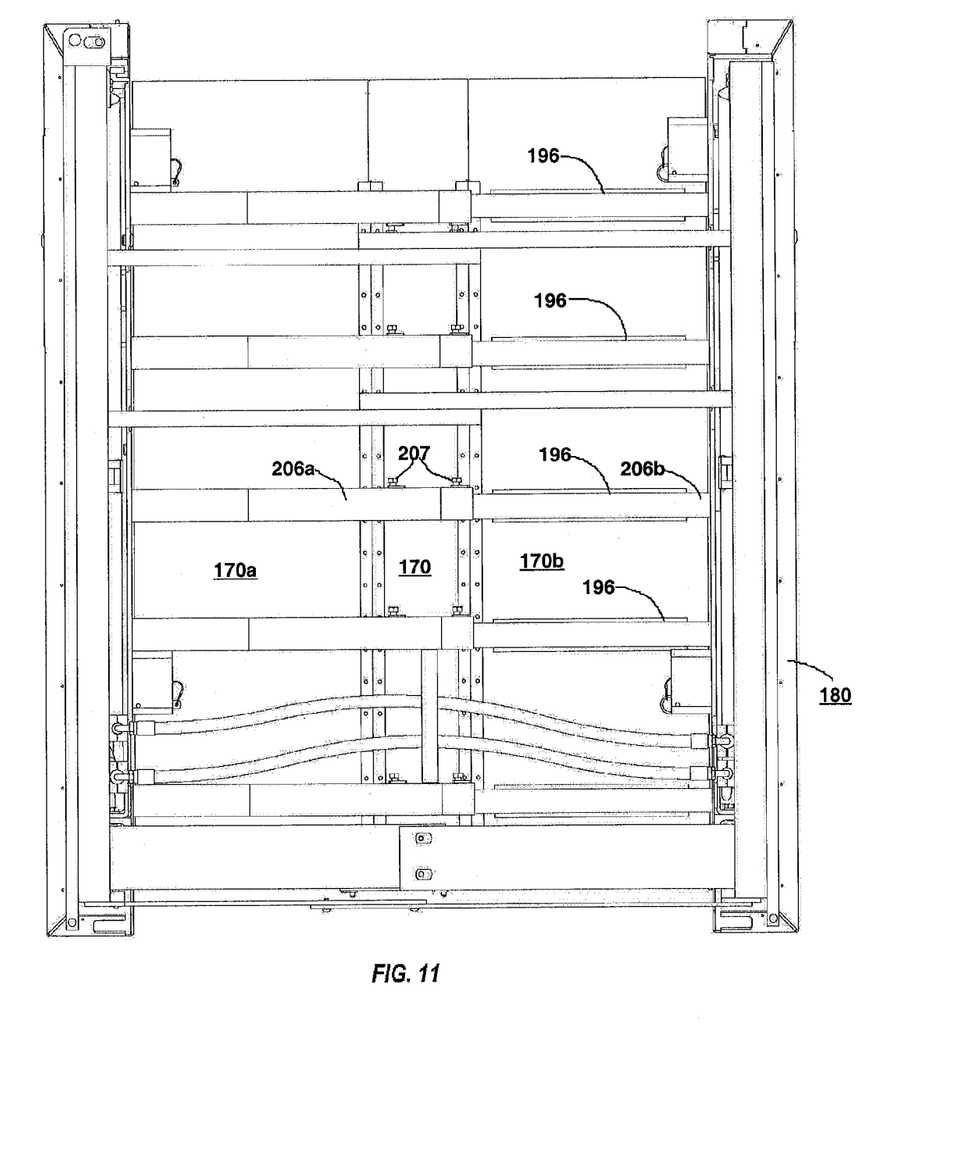
FIG. 11 is a bottom view of the lift device shown in FIG. 10 and illustrating telescoping cross braces extending across the lift car below the floor panels.
Figure 12:
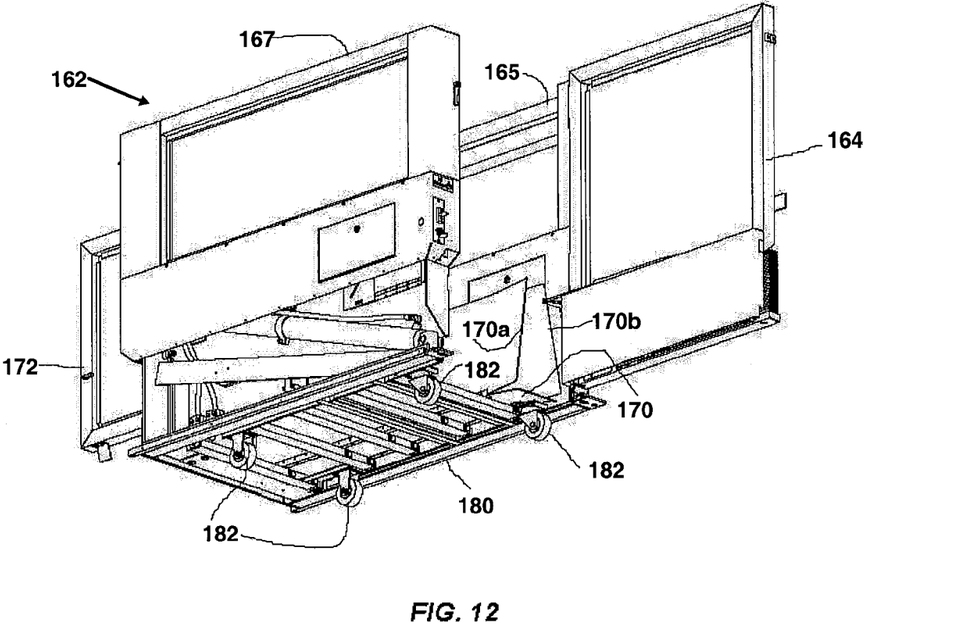
FIG. 12 is a perspective view of the lift device showing the bottom of the lift device with the hinged floor panels extending upwardly, with the lift car in its narrowed configuration, and with four casters installed on the bottom of the lift car, for transporting the lift device through a narrow passage.
Figure 13:
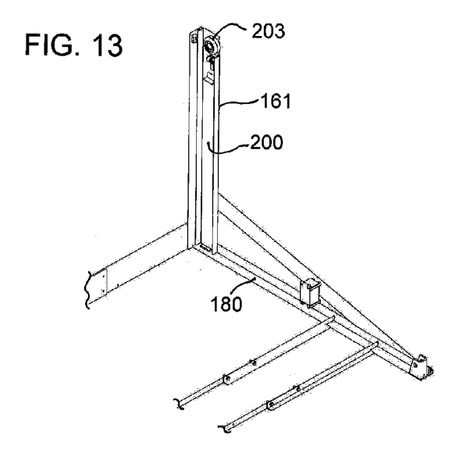
FIG. 13 is a partial perspective view of the support base (180) of the lift device including the first support (161).
Figure 14:
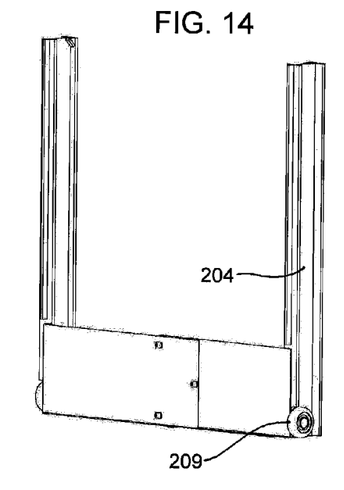
FIG. 14 is a perspective view of a movable intermediate member (204).
Figure 15:
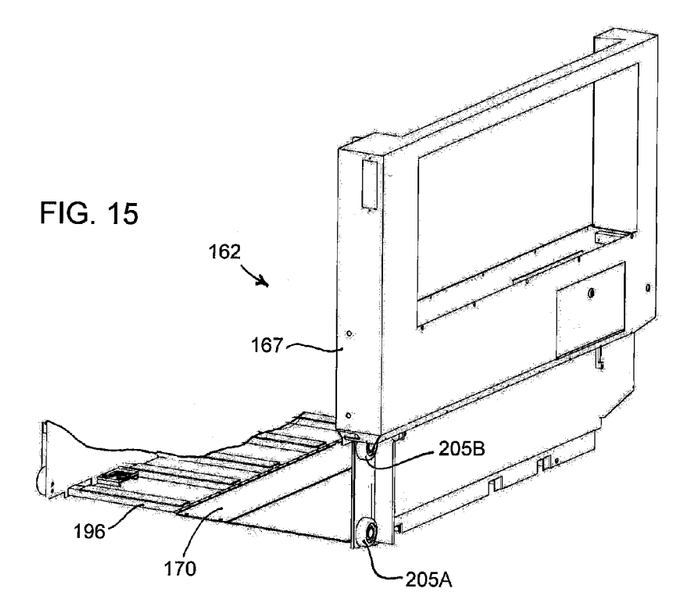
FIG. 15 is a partial perspective view of the rear of lift car 162 including rollers (205) for engaging the intermediate member (204).

Preferably, the first and second supports (161,163) of the aforementioned lift device extend upwardly by less than the maximum elevational height to which the floor of the lift car can be raised, thereby maintaining a relatively low profile for such lift device. A preferred manner of achieving this result is to include a generally vertical fixed track (200) within the first support (161), of essentially the same height as the first support (161). With reference to FIG. 13, fixed track 200 extends within first support 161, and a roller 203 is mounted at the upper end of track 200. A movable intermediate member (204) slides along the fixed track (200) and includes a lift car track. With reference to FIG. 14, movable intermediate member 204 includes an outwardly-facing track 204 for mating with fixed track 200 of first support 161; roller 203 rides within the outwardly-facing track of movable intermediate member 204, and roller 209, mounted at the bottom of intermediate member 204, rides within fixed track 200. Intermediate member 204 also includes an inwardly-facing lift car track. The lift car (162) includes at least one roller (205) that engages the lift car track of the intermediate member (204) for guiding the lift car to its final elevation. As shown in FIG. 15, rollers 205A and 205B are mounted on the rear end of lift car 162 inside side wall 167 for engaging the inwardly-facing lift car track of intermediate member 204. Preferably, the same arrangement is provided in conjunction with the second support (163) so that both sides of the lift car (162) are guided in the manner just described.

Another aspect of the present invention relates to a lift device for persons with disabilities, which lift device again includes a lift car (162) suitable for supporting a person (166) in a wheel chair (168) and including a front entry door (164) used to enter the lift car from the ground, a support base (180) for resting upon a ground surface, a lifting mechanism (50, 52) coupled between the support base and the lift car for selectively raising and lowering the lift car relative to the support base; and a scissors-like brace (179) for selectively locking the front door (164) of the lift car to the support base when the lift car is elevated above the ground surface. The scissors-like brace (179) helps stabilize the lift car (162) relative to the support base (180), and keeps the front entry door (164) closed, when the lift car (162) is elevated a nominal amount above the ground. On the other hand, the scissors-like brace (179) unlocks when the lift car (162) is lowered to the ground surface for allowing the front entry door (164) to be opened.

Another aspect of the present invention relates to a portable lift device for persons with disabilities that can be compressed to fit through narrowed passageways. The lift device includes a lift car (162) suitable for supporting a person (166) in a wheel chair (168) when configured in a normal use mode; during such normal use mode, the floor (170/196) of the lift car has a deployed width that accommodates wheel chairs. However, the lift car (162) can also be configured into a compressed transport mode wherein the floor (170/196) of the lift car has a reduced width narrower than its deployed width. The compressed transport mode allows the lift device to be transported through narrow passages that would otherwise interfere with transport of such lift device.

The aforementioned portable lift device preferably has a lift car floor (170/196) that includes at least a first hinged panel (170a) that extends horizontally when the lift device is in its normal use mode, but which is rotated generally toward a vertical orientation when the width of the lift device is to be minimized. Ideally, the lift car floor includes two of such hinged panels (170a/170b). The floor panels are preferably supported by at least one underlying telescoping cross brace (196), but preferably, by a number of such telescoping cross braces (196/196). The length of the telescoping cross braces (196) can be shortened after the hinged panels (170a/170b) are rotated toward their vertical orientation, thereby reducing the overall width of the lift device. Each telescoping cross brace (196) preferably includes a first tubular member (206b) extending from a first side of the lift car, and a second tubular member (206a) extending from the opposing second side of the lift car. The second tubular member (206a) has a greater cross-sectional dimension than the first (206b), allowing the first tubular member (206b) to slidably extend within the second tubular member (206a). A fastener (207) releasably secures the first and second tubular members in a fixed relationship for adjusting the length of the telescoping cross brace (196).

Another aspect of the present invention relates to an easily transportable lift device to provide access to a stage (174) for individuals with disabilities, wherein a series of casters or wheels (182) are removably mounted to the bottom of the lift car (162). As before, the lift device includes a support base (180) that normally rests upon the ground surface, as well as a lifting mechanism (50, 52) coupled between the support base and the lift car for selectively raising the lift car or lowering the lift car relative to the support base.

The casters (182) can be easily mounted to the bottom of the lift car (162) by slightly elevating the lift car to provide access to the underside of the lift car. The casters (182) are then inserted into the bottom of the lift car. Once the casters are secured to the bottom of the lift car, lowering the lift car toward its fully-lowered position causes the wheels (182) to engage the floor. Further operation of the lifting mechanism (in the "lowering" direction) actually causes the support base (180) to be raised off of the ground, causing all of the weight of the lifting device to be borne by the casters (182), thereby facilitating convenient transport of the lift device. When the lift device is transported to its new location, the lift mechanism is operated to raise the lift car (162), thereby taking the weight of the lift device off of the casters (182). With the lift car in a slightly elevated position, the casters (182) can be easily removed, thereby allowing the floor (170/196) of the lift car to be fully lowered back to the ground.

Another aspect of the present invention relates to a lift device to provide access to a stage (174) for individuals with disabilities wherein the maximum height adjustment mechanism (184) is self-contained within the lift car (162). As before, the lift device includes a lift car (162) for supporting a person (166) in a wheel chair (168), a support base (180) for resting upon a ground surface, and a lifting mechanism (50, 52) coupled between the support base (180) and the lift car (162) for selectively raising the lift car or lowering the lift car relative to the support base. An adjustable control member (190, 192) housed within a side wall (167) of the lift car, and accessible through a panel (186, 188) of such side wall (167), can be adjusted before the lift car is raised for selecting the maximum height to which the lift car should be lifted. If, upon operating the lift device, the floor (170/196) of the lift car is not even with the stage (174), the adjustable control member (190, 192) can be shifted slightly until the desired height is achieved. Once the desired height is achieved, the adjustable control member (190, 192) is locked in place, and the lift car (162) can then be repeatably raised to the height of the stage (174).

Preferably, the adjustable control member (190/192) causes the lifting mechanism to be disengaged, as by cutting electrical power (154) to the hydraulic pump motor (at least in the elevating direction), as the lift car reaches the desired stage height. The adjustable control member preferably includes a lever arm having a first end pivotally mounted to one of the side walls of the lift car. The second end of the lever arm sweeps through an arc as the lever arm pivots about its first end. An arcuate track (192) is preferably provided generally proximate to the second end of the lever arm, and a releasable fastener (190) releasably secures the second end of the lever arm to a selected point on the arcuate track. An electrical switch (154), either mounted to the lever arm for selectively engaging another member, or mounted to another member for selectively engaging the lever arm, is used to sense that the lift car has reached its desired height, and prevents further operation of the lift mechanism as would cause the lift car to be further elevated.

DETAILED DESCRIPTION OF THE PREFERRED EMBODIMENTS

The portable wheelchair lift device of the present invention uses side supports (161, 163) that extend only about 43 inches above the ground, but the lift device is capable of raising the floor (170/196) of the lift car (162) to a stage height of 60 inches. Nonetheless, because the sidewalls (165, 167) and gates (164, 172) of the lift car are 43 inches tall, the lift device is safe for persons using crutches or walkers, in addition to wheelchair users.

By eliminating the need for an entry ramp, the lift device of the present invention requires approximately 55% less floor space as compared with a similar lift device that includes an entry ramp. The lift device requires only 5 feet of linear space in use, plus perhaps another 4 feet of space near the entry door to allow the user room to maneuver into and out of lift car. In contrast, use of the lift replaces up to 65 feet of linear ramp, saving not only the cost of the ramp itself and the space it takes up, but also the cost of the labor for installing and removing the ramp.

By allowing the lift device to be compressed to a width narrower than 36 inches (e.g., down to 33 inches), the lift device can be transported through relatively narrow doorways, allowing it to be used in a wider variety of locations, including buildings with single doorways, such as older schools. The lift is compressed and then pushed through the door on its own wheels (182). Converting the lift device for passage through narrow doorways only requires a simple tool kit.

The lift device of the present invention is a completely self-contained compact unit, and does not require any additional components, such as stage height sensors or the like. When constructed in accordance with the preferred embodiment, the lift device can easily lift a load of 750 pounds.

The portability feature of the present invention makes it possible for public facilities to save on the cost of installing multiple fixed lifts or ramps since one lift can serve multiple locations. Moreover, the use of the present lift saves valuable floor space that would otherwise be occupied by fixed ramps. The lift device of the present invention can be used by schools, colleges and universities, convention centers, auditoriums, arenas, churches, hotels, conference centers, parks and recreational facilities, courtrooms, senior activity centers, outdoor amphitheaters, fairgrounds, stadiums, amusement parks, coliseums, virtually any public facility where temporary access to stages or platforms may be required.

The lift device of the present invention can be operated independently (i.e., without the aid of an attendant) by individuals with disabilities, as required by the American with Disabilities Act (ADA), and meets all applicable ADA requirements. The lift device allows individuals with disabilities to participate in stage or platform-related activities, such as graduation ceremonies or musical performances. A grab bar extends for the full length of the inside wall of the lift car, and slip resistant surfaces are provided on the car floor and dock plate. Multiple control stations are provided, one inside the car for passenger operation, and two other control stations at the front and back ends for attendant operation, if desired. Each control station includes a constant pressure "UP/DOWN" switch (138), and the control station inside the lift car includes a separate "PUSH TO STOP" emergency button (160). The emergency stop button inside the lift car locks when pushed, and requires manual reset before operation can resume.

The lift device of the present invention is supplied with a three prong grounded electrical cord designed to be plugged into a standard 120-volt wall outlet providing 60 Hertz, single phase, 10 amp service. Once plugged in, the lift device draws only 9 amps, and is ready for use. Of course, the power supply (111) can be configured for 220/240-volt operation for use in other countries. All operating controls operate from a reduced voltage of 12 VDC. A Ground Fault Circuit Interrupter (GFCI) is incorporated within the power supply to shut off power in case of partial or complete short circuit or current overload. The hydraulic pump (58) is directly coupled to a capacitor-start one-half horsepower motor (56). Other than this hydraulic pump motor, all control and operating circuits operate from the 12 VDC solid state linear power supply (111).

No building alterations or site preparations are required. The lift only needs 5 feet of clearance in front of a stage, plus approximately four feet of free space near the entry door to allow the user to maneuver into or out of the lift device. This feature is ideal for auditoriums or other venues with limited space between the stage and seating area.

One of the advantages of the present lift device is that it can be used while an event is in progress. The lift maintains a low profile, and its quiet operation will not interrupt a performance. The entry and exit gates (164, 172), and much of the side walls (165, 167), are preferably made of transparent high-impact thermoplastic, making the lift unobtrusive to audiences. The passenger (166) also has a clear view of the surroundings. The hydraulic operation of the lift device provides a smooth ride and will not draw unnecessary attention to passengers. In view of its ease of use, the lift device provides accessibility for all ages.

The lift device of the present invention can be set up in only a few minutes. The lift device can be used when needed and then simply stored away when no longer needed. The lift device, in its preferred embodiment, requires a storage space of only 48 inches×60 inches.

When the transport wheels (182) are installed on the bottom of the lift car (162), the lift device is easily moved by one person, rolling on its own wheels. Once rolled into a desired position, the wheels (182) can be quickly removed to provide a stable platform for operation. The transport wheels (182) are stored in the base frame (180) when the lift device is not being transported. The transport wheels (182) are preferably fabricated from hard rubber. The transport wheels can be installed onto, and removed from, the lift car without tools. When the wheels are installed, the lift device can be rolled easily over any hard, smooth, level surface. Alternatively, the lift can be transported by fork lift, truck, or trailer when it must be moved over relatively long distances. Moreover, the lift device of the present invention can accommodate larger wheels than other lifts, making the present lift ideal for outdoor use.

The stage adjustment device (184) can be used to quickly set the correct stage height, i.e., the maximum height to which the floor of the lift car is elevated, without the need for any tools. This adjustment device can be concealed by a locked panel (188) accessible via a key to prevent unauthorized use.

As the stage gate (172) opens, a hinged dock plate (176) automatically lowers into position, spanning the gap between the lift car (162) and the stage (174). The dock plate (176) rests on the stage (174) and provides a smooth transition between the lift car floor (170/196) and the stage (174). When the stage gate (172) is closed, the dock plate (176) is simultaneously retracted. The lower landing gate, or entry gate (164) to the lift car (162) is provided with an electro-mechanical interlock (179) that prevents the entry gate (164) from being opened whenever the car is more than 2 inches above the fully lowered position. In addition, electrical switches (152, 150) are provided at both the entry gate (164) and stage gate (172) to prevent any movement of the lift car (162) if either gate is open. In addition, a safety skirt (181) completely encloses and protects the area under the lift car (162). For safety reasons, both the lower entry gate (164) and the upper stage gate (172) are self-closing.

In the event of a power failure, the electrical motor (56) that powers the hydraulic pump (58) will not operate. For this reason, a hydraulic hand pump (80) is provided in an emergency to raise and lower the lift car (162) without electrical power.

The lift device constructed in accordance with the present invention weighs approximately 975 pounds maximum, provides vertical lift/lowering speeds of seven (7) feet per minute, and is capable of elevating the lift car to an elevational height within the range of 12 inches to 60 inches in infinitely adjustable increments. The lift car floor area (170) is preferably 36"×48", and as noted earlier, the gates (164, 172) and side panels (165, 167) of the lift car are 43 inches tall. Before being compressed to narrow passage mode, the lift device has an overall width of approximately 48 inches. The lift car (162), base support frame (180), and the hydraulic lifting cylinders (50, 52) are all preferably formed from ASTM A36, AISI 1018, or AISI 1020 Steel. All transparent windows are preferably fabricated from ¼" thick high impact strength clear thermoplastic.

Those skilled in the art will now appreciate that a simple and inexpensive portable wheel chair lift apparatus has been described. While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

We claim:

1. A lift device to provide access to a stage for individuals with disabilities, the lift device including:
   a) a lift car for supporting a person in a wheel chair, the lift car having a floor, a front entrance, first and second opposing sides, and first and second opposing side walls;
   b) the floor of the lift car engaging, and being supported by, a ground surface when the lift car is in a fully-lowered position, the ground surface supporting the person in the wheel chair before such person enters the lift car;
   c) first and second opposing supports for resting upon the ground surface, the first and second opposing supports being disposed on opposing sides of the floor of the lift car, the first and second opposing supports including first and second vertical tracks, respectively;
   d) the first side of the lift car slidingly engaging the first vertical track of the first support, and the second side of the lift car slidingly engaging the second vertical track of the second support;
   e) a first hydraulic cylinder having first and second ends, the first end of the first hydraulic cylinder being coupled to the first support, and the second end of the first hydraulic cylinder being coupled to the first side of the lift car, the first hydraulic cylinder extending at a substantial angle relative to the first vertical track;
   f) a second hydraulic cylinder having first and second ends, the first end of the second hydraulic cylinder being coupled to the second support, and the second end of the second hydraulic cylinder being coupled to the second side of the lift car, the second hydraulic cylinder extending at a substantial angle relative to the second vertical track;
   g) an electric motor and hydraulic pump for pumping hydraulic fluid into the first and second hydraulic cylinders;
   h) the floor of the lift car resting upon the ground surface when the lift car is in its fully-lowered position, whereby a user may enter or exit the lift car without the aid of a loading ramp when the lift car is in its fully-lowered position.

2. The lift device recited by claim 1 including:
   a) first and second movable intermediate members for sliding along the first and second vertical tracks, respectively, the first and second movable intermediate members including first and second lift car tracks, respectively;
   b) a first roller mounted to the first side of the lift car for engaging the first movable intermediate member; and
   c) a second roller mounted to the second side of the lift car for engaging the second movable intermediate member.

\* \* \* \* \*